July 13, 1954 R. W. SAMSEL 2,683,866
PIEZOELECTRIC CRYSTAL PROTECTIVE DEVICE
Filed Oct. 1, 1945
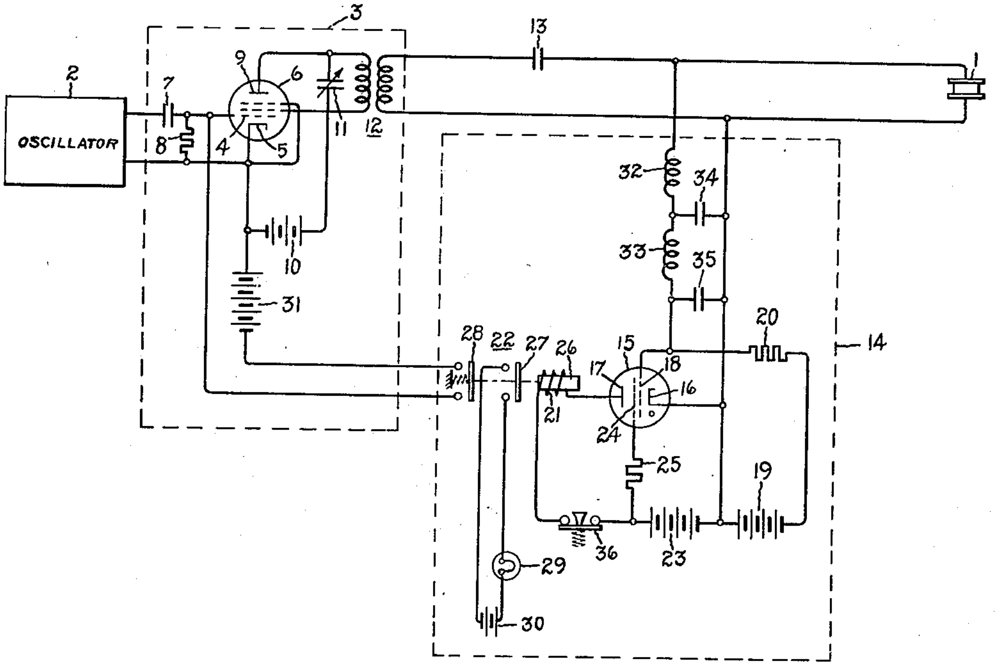
Inventor:
Richard Warren Samsel,
by Merton D. Morse
His Attorney.

Patented July 13, 1954

2,683,866

UNITED STATES PATENT OFFICE 2,683,866

PIEZOELECTRIC CRYSTAL PROTECTIVE DEVICE

Richard Warren Samsel, Schenectady, N. Y., assignor to General Electric Company, a corporation of New York Application October 1, 1945, Serial No. 619,723

9 Claims. (Cl. 340—10)

This invention relates to piezoelectric transducers and particularly to apparatus for preventing injury of piezoelectric crystals in such transducers.

Some forms of underwater signaling and object locating apparatus operate at supersonic frequencies and when these devices employ piezoelectric crystal transducers they require relatively small crystals. Quartz crystals may be employed, but for some applications they are not entirely satisfactory because of the high excitation voltages required. It is therefore proposed to employ other crystals, such as Rochelle salt crystals, which are not as rugged as the quartz crystal and are also soluble in water. Rochelle salt crystals have the advantage that they do not require high excitation voltages; however, they are subject to disadvantages because of their solubility in water and also because they are sensitive to changes in temperature and may be destroyed by relatively small increases in temperature. It has been proposed to provide warning devices to indicate the presence of water or high temperature in the vicinity of the crystals; however, such warning devices are not adequate to protect the crystals from destruction because the time required for an operator to perceive the warning and then act to save the crystal is too great. Accordingly it is an object of this invention to provide an improved device for protecting piezoelectric crystals.

It is another object of this invention to provide a device for detecting undue rises in temperature or the presence of moisture around a piezoelectric crystal and to stop the excitation of the crystal to prevent injury thereof.

Another object of the invention is to provide a simple and automatic control for apparatus employing piezoelectric crystals which will stop excitation of the crystal whenever dangerous temperature or moisture conditions arise.

The novel features which are believed to be characteristic of the invention are set forth with particularity in the appended claims. The invention itself, however, both as to its organization and method of operation, together with further objects and advantages thereof, may best be understood by reference to the following decription taken in connection with the accompanying drawing, the single figure of which represents diagrammatically a crystal protective apparatus embodying the invention.

Briefly, the apparatus shown on the drawing comprises a piezoelectric transducer including a Rochelle salt crystal arranged to be excited from a suitable oscillator and amplifier so that the crystal converts electric energy into sound vibrations. In order to avoid injury or destruction of the crystal which might be caused by high temperature or moisture, a control circuit is provided which is responsive to the passage of direct current through the crystal and stops excitation of the crystal as soon as the direct current flowing therethrough reaches a predetermined value.

Referring now to the drawing, a piezoelectric crystal 1 is connected to be energized by a suitable high frequency oscillator 2 through an amplifier 3. The crystal 1 may be a Rochelle salt or other suitable crystal arranged in a waterproof transducer housing for the transmitting of sound waves under water. When the oscillator 2 is operating, the output thereof is impressed between a control grid 4 and a cathode 5 of an amplifying tube 6, the control grid 4 being coupled to the oscillator through a condenser 7 and a grid coupling resistor 8. The tube 6 includes an anode 9 connected to a suitable source of direct current 10 through a tuned circuit including a variable capacitor 11 and the primary winding of a transformer 12. The secondary winding of the transformer 12 is coupled to the crystal 1 through a capacitor 13 so that the output of the oscillator 2 of the amplifier 3 is impressed on the crystal and the crystal is energized, thereby transmitting the required supersonic vibration.

Rochelle salt crystals and other similar crystals suitable for use in piezoelectric transducers are susceptible to injury by increased temperatures and also by moisture, and it has been found that, both when the temperature rises above a predetermined level and also when moisture is present, the resistance of the crystal decreases and there is danger that when the crystal is excited it will be overheated and destroyed. It has also been found that the time between the occurrence of either an adverse temperature or moisture condition and the destruction of the crystal is so short that an operator cannot expect to save the crystal after detecting the presence of the adverse condition. In order to stop the excitation of the crystal in the apparatus illustrated, there is provided a protective device 14 which is responsive to the flow of a predetermined amount of direct current through the crystal 1 and is arranged to bias the amplifier 3 to cut off and prevent further excitation of the crystal whenever an adverse temperature or moisture condition prevails. The device 14 includes an electron discharge device 15 having a cathode 16 and an anode 17, and a control electrode 18. The control electrode 18 is biased negatively with respect to the cathode 16 by a suitable source of direct current indicated as a battery 19, the negative terminal of which is connected to the control electrode through a resistance 20. The device 15 is a gas-filled tube having operating characteristics such that a large current flows through the tube substantially instantaneously upon the occurrence of a predetermined bias. The anode 17 is connected through an operating coil 21 of a relay 22 to the positive terminal of a suitable source of direct current, such as a battery 23. The tube 15 is also provided with a screen grid 24 connected through a resistance 25 to the source 23. Whenever a potential is impressed on the control electrode 18 such that current flows through the tube 15, energization of the coil 21 picks up an armature 26 and simultaneously closes switches 27 and 28 of the relay. Closing of the switch 27 connects a pilot light 29 across a battery 30 to energize the pilot light and indicate operation of the relay. Closing of the switch 28 connects a direct current source, such as a battery 31, between the cathode 5 and control electrode 4 of the device 6 to impress a negative bias on the control electrode sufficient to cut off the device 6 and prevent further operation of the amplifier 3.

In order to make the operation of the device 14 dependent upon the change in resistance of the crystal 1 which might occur either on a temperature rise or on the presence of moisture, the crystal is connected between the control electrode 18 and the cathode 16 of the tube 15. A suitable filter comprising inductances or chokes 32 and 33 and capacitors 34 and 35 is connected between the transducer 1 and the tube 15 in order to prevent the passage of the alternating current through the battery 19 and resistance 20. Under normal conditions of operation, the extremely high resistance of the crystal 1 prevents the passage of direct current from the source 19 through the resistance 20 since the crystal is in series between the resistance 20 and the return connection to the source 19; however, should the resistance of the crystal be reduced because of adverse temperature or moisture conditions, then current from the battery 19 will flow through the resistance 20 and the crystal and render more positive the bias on the control grid 18 thereby causing the tube 15 to become conducting and actuate relay 22. Actuation of the relay cuts off the amplifier 3 and prevents further energization of the transducer 1 by the oscillator 2 although the oscillator remains in operation. The change in resistance of a piezoelectric crystal because of the adverse temperature or moisture conditions is great and may be as much as in a ratio of fifty million to one. It is therefore possible to arrange the protective device 14 so that it detects a relatively small portion of the total possible change and prevents continued energization of the crystal by the power from the oscillator thereby preventing injury to the crystal. The pilot light 29 gives an immediate warning to the operator that the protective device has been actuated.

It will be obvious that when current is flowing through the tube 15 for any reason, it will not be possible to operate the amplifier 3. For this reason a normally closed reset switch 36 is provided to disconnect the anode 17 from the source 23 and reset the relay 22 to recondition the amplifier for operation. It will be understood, however, that the reset button is to be employed only when an adequate investigation has been made to determine that restarting of the system will not destroy the crystal.

It will readily be apparent from the foregoing that the protective circuit described provides a simple and effective arrangement for cutting off energization of a crystal transducer substantially instantaneously upon the occurrence of an adverse temperature or moisture condition.

While the invention has been described in connection with a transducer for underwater operation, other applications will readily be apparent to those skilled in the art. It is not desired, therefore, that the invention be limited to the particular arrangement illustrated and described, and it is intended by the appended claims to cover all modifications within the spirit and scope of the invention.

What I claim as new and desire to secure by Letters Patent of the United States is:

1. An electroacoustic transmitting apparatus comprising an electronic oscillation generator, a piezoelectric crystal transducer, means connecting said generator to energize said transducer and produce sound vibrations in the medium surrounding said transducer, means for applying a direct current voltage across said crystal, and means responsive to the passage of direct current through said crystal for interrupting the supply of energy from said oscillator to said crystal.

2. An electroacoustical transmitting apparatus comprising an electronic oscillator, an output amplifier for said oscillator, a piezoelectric crystal transducer connected to be energized by said amplifier to transmit sound waves through the medium surrounding said transducer, normally inoperative means for biasing said amplifier beyond cutoff to disconnect said oscillator and said transmitter, means for applying a direct current voltage across said crystal, and means responsive to the passage of a predetermined value of direct current through said crystal for actuating said biasing means to cut off said amplifier and prevent passage of excessive current through said crystal.

3. An electroacoustical transmitting apparatus comprising an electronic oscillator, a piezoelectric crystal for converting electric energy into sound energy, means for connecting the output of said oscillator across said crystal, an electron discharge device having an anode and a cathode and a control electrode, means dependent upon the passage of current through said device for interrupting the supply of energy from said oscillator to said crystal, means for biasing said device to prevent the passage of current therethrough, and means dependent upon a decrease in resistance of said crystal for overcoming said biasing means to render said device conducting and to prevent the supply of energy to said crystal from said oscillator.

4. An electroacoustical transmitting apparatus comprising an electronic oscillator, a piezoelectric crystal for converting electric energy into sound energy, means for connecting the output of said oscillator across said crystal, an electron discharge device having an anode and a cathode and a control electrode, means dependent upon the passage of current through said device for interrupting the supply of energy from said oscillator to said crystal, means including a source of direct current connected across said crystal for biasing said device to cutoff, filter means for minimizing the passage of alternating current from said oscillator through said biasing means, said biasing means being arranged to become inoperative and to render said device conducting upon the passage of a predetermined amount of direct current through said crystal to prevent energization of said crystal by said oscillator.

5. An electroacoustical transmitting apparatus comprising an electronic oscillation generator, a piezoelectric crystal for converting electric energy into sound energy, means including an electronic amplifier for connecting said oscillator to energize said crystal, means including an electron discharge device for rendering said amplifier inoperative upon the passage of current through said device, and means including a source of direct current connected across said crystal for biasing said device to cutoff and for rendering said device conducting upon the passage of a predetermined value of direct current through said crystal to interrupt energization of said crystal by said oscillator.

6. An electroacoustic apparatus comprising an electronic oscillation generator, a piezoelectric crystal transducer, means connecting said generator to energize said transducer and produce sound vibrations in the medium surrounding said transducer, and means dependent upon a change in the impedance of said crystal for interrupting the supply of energy from said oscillator to said crystal.

7. An electroacoustic apparatus comprising an electronic oscillation generator, a piezoelectric crystal transducer, means connecting said generator to energize said transducer and produce sound vibrations in the medium surrounding said transducer, and means dependent upon a predetermined decrease in the resistance of said crystal for interrupting the supply of energy from said oscillator to said crystal.

8. An electroacoustic transmitting apparatus comprising an electronic oscillation generator, a piezoelectric crystal transducer, means connecting said generator to energize said transducer and produce sound vibrations in the medium surrounding said transducer, means for applying a direct current voltage across said crystal, and means responsive to the passage of direct current only through said crystal for interrupting the supply of energy from said oscillator to said crystal.

9. An electroacoustic apparatus comprising an electronic oscillation generator, a piezoelectric crystal transducer, means connecting said generator to energize said transducer and produce sound vibrations in the medium surrounding said transducer, and means dependent only upon a predetermined decrease in the resistance of said crystal for interrupting the supply of energy from said oscillator to said crystal.

References Cited in the file of this patent

UNITED STATES PATENTS

| Number | Name | Date |
| --- | --- | --- |
| 1,608,048 | Taylor | Nov. 23, 1926 |